Patented Jan. 7, 1947

2,413,698

UNITED STATES PATENT OFFICE 2,413,698

PROCESS FOR THE RECOVERY OF UNFERMENTED AND UNFERMENTABLE SUGARS FROM SACCHARIFIED STARCH SOLUTIONS

Eduard Färber, New Haven, Conn., and James S. Wallerstein, New York, N. Y., assignors to The Overly Biochemical Research Foundation, Inc., New York, N. Y., a corporation of New York No Drawing. Application July 30, 1943, Serial No. 496,834

16 Claims. (Cl. 195—38)

This invention relates to the separation and recovery of unfermented and likewise of unfermentable sugars from saccharified starch solutions, and more particularly, to the separation of maltose and other polyoses from solutions of saccharified starchy materials.

It is the general object of the invention to effect efficient removal of maltose and other polyoses which either are entirely unfermentable or remain unfermented during the particular conditions of fermentation, for example, alkaline fermentation, to which a saccharified starchy material is subjected.

It is also an object of the invention to provide a process for the preliminary purification of saccharified starchy materials prior to subjecting such materials to a fermentation during which the separated sugars are either not converted or are converted only partially, whereby a fermented mash is obtained, in which the content of unfermented sugar is greatly reduced over prior procedures, so that the recovery of the conversion products, and particularly of glycerol, is greatly facilitated.

It is a further object of the invention to effect purification of the fermented liquor obtained by the alkaline fermentation of saccharified starchy materials, by removal of a large part, if not all, of the unfermented sugar content of the liquor, so as thereby to facilitate and improve the recovery of the products of the fermentation from the liquor.

Other objects and advantages of the invention will become clear as the more detailed description thereof proceeds, and the features of novelty will be set forth in the appended claims.

In accordance with the present invention, a saccharified starchy material is subjected, either before or after fermentation, to the action of an oxide or hydroxide of an alkaline earth metal, and especially of calcium or strontium, whereby maltose and other polyoses are precipitated in the form of their more or less insoluble combinations with the alkaline earth metal oxide or hydroxide; whereafter the precipitated material may be decomposed by means of an acid, preferably one which forms an insoluble or sparingly soluble compound with the alkaline earth metal, and the maltose and other polyoses so liberated may then be acid-hydrolyzed to convert them to glucose or other fermentable sugars. This hydrolyzed sugar solution may then be combined with a new batch of saccharified starchy material and subjected to fermentation. Where the treatment with the alkaline earth metal oxide or hydroxide is conducted after the fermentation of the saccharified starchy material, the fermented liquor is preferably first filtered to remove the yeast which may then be re-used for fermenting other batches.

We have found that when an alkaline earth oxide, for example, calcium or strontium oxide, in finely ground form, is added to solutions containing maltose and other polyoses at relatively low temperatures (0° to 40° C.) a precipitate is formed which contains the polyoses in combination with the alkaline earth oxide. The precipitate settles out after a period of standing, and may be readily removed from the mother liquor by filtration, centrifugation, or often by simple decantation, preferably at low temperatures. The temperature is not critical within the specified limits; near the lower limit, formation of the compound may be slow and filtration difficult; near the upper limit, it is necessary to carry out the precipitation quickly, otherwise dark colored decomposition products are formed. These occur if the temperature is permitted to rise substantially beyond the upper limit cited.

The alkaline earth must be thoroughly admixed with the solution for a complete reaction. An efficient way of carrying this out consists in treating the mixture in a ball mill or similar mechanical mixing device. Subsequently, the maltose and other polyoses may be recovered from the precipitate by treatment of the compound with acids which form insoluble or sparingly soluble salts with the alkaline earth metals, the effect here being to convert the alkaline earth oxides into salts and to bring the polyoses into solution. It is particularly advantageous to form a salt which is but sparingly soluble in order that the solution of the polyoses may be reasonably pure for subsequent uses. Thus, for example, maltose may be precipitated with lime and then redissolved by means of sulfuric acid, forming the sparingly soluble calcium sulfate, and leaving a fairly pure sugar solution. Gaseous acid anhydrides which form insoluble or sparingly soluble alkaline earth metal compounds, are also effective agents; thus carbon dioxide may be added down to pH 6.0, the insoluble carbonates thus formed being readily removed. Sulphur dioxide may be similarly employed.

The process is of particular advantage where the saccharified solution of starchy materials is employed for the production of glycerol by an alkaline fermentation. Under these conditions, the glucose is fermented whereas the maltose ferments at best very slowly. Any residual unfermented sugar (consisting mainly of maltose) remaining in the mash will tend to interfere with the subsequent distillation of the glycerol from the concentrated slops. Unfermented sugars under these conditions tend to form dark colored and caramel-like compounds which entrap the glycerol formed by the fermentation and prevent its ready volatilization by means of steam. By the use of lime or other alkaline earths, at least most of the maltose and other polyoses not converted by prior hydrolysis to glucose, or formed from glucose during the fermentation, can be removed and recovered for other use. The mash itself can be purified by converting the sugars which are essentially unfermentable under alkaline conditions into insoluble compounds with alkaline earth oxides or hydroxides.

The recovered maltose may be used as such or for alcoholic fermentation under non-alkaline conditions, or, together with the other polyoses, it may be hydrolyzed to glucose with the aid of a mineral acid like sulfuric, and then fermented to glycerol under alkaline conditions.

By the removal of the unfermented di- and polysaccharides, either before or after an alkaline glycerol fermentation, lighter colored slops are obtained, improved yields of glycerol are secured, and readier distillation takes place with less frothing and foaming. The amount of alkaline earth oxide required varies according to conditions as to solubility and concentration of the polyoses but it has been found advantageous to use between one and two molar weights of alkaline earth oxide to one calculated molar weight of glucose present, in the form of the polymeric sugar.

After the addition of the alkaline earth metal oxide in the specified amount, the mixture will show a high alkalinity. By reducing this alkalinity, for instance, to a pH value not substantially above pH 8.0, but still in the alkaline range, a considerable increase in insoluble carbohydrate compound is obtained. This may be due to the mutual influences on solubility of excess alkaline earth metal oxides and dissolved polymeric carbohydrate.

This adjustment of the pH can be carried out by using carbon dioxide gas in such amounts that the alkalinity is lowered to a pH range between 7.5 and 8.0.

This additional removal of carbohydrate from the fermented solution is a valuable step in the purification of the fermented liquors from which glycerine is to be recovered. A further advantage achieved by this method in the case of fermentation mashes consists in producing solutions which on concentrating remain clear and do not deposit large amounts of insoluble matter.

In recovering sugar from a fermented mash by the process of the invention, precipitation of the alkaline earth carbohydrate compound is greatly aided by the presence of alcohol. Thus it is advantageous to precipitate the unfermented sugar prior to recovery of the alcohol contained in the fermentation liquor.

Example 1.—A wheat mash is used for the production of glycerol by fermentation. The wheat starch is gelatinized and then hydrolyzed by means of dilute mineral acids, as, for example, sulfuric acid. Subsequently, the acidity is neutralized by means of lime, forming calcium sulfate, which is separated. Thereafter finely ground lime is added to the sugar solution in an amount slightly in excess of equimolar proportion with reference to the unfermentable sugars present. The materials are mixed in a ball mill, and the mixture permitted to stand at room temperature of about 25° C. A yellowish brown precipitate is formed containing disaccharides and polysaccharides not converted to glucose, in combination with the lime. For complete precipitation, the solution is cooled to about 5° C. overnight. This precipitate is removed by filtration. Subsequently, an alkaline fermentation of the mash is carried out; the alcohol removed by distillation; and the mash concentrated, acidified and steam-distilled under reduced pressure. Under these conditions, glycerol will be more readily recovered than if no such lime treatment had taken place.

Meanwhile, the sugar-lime precipitate formed is treated with dilute sulfuric acid, the insoluble calcium sulfate formed filtered off, the sugar being thereby redissolved, and the acidity is adjusted to a substantially acid pH (pH 0-1) with sulfuric or hydrochloric acid. After a period of several hours at temperatures near the boiling point, the disaccharides and polysaccharides will be converted substantially to glucose which, if desired after partial or complete neutralization, may be added to a subsequent mash.

Example 2.—At the end of an alkaline glycerol fermentation of a saccharified wheat mash and after the removal of the yeast but before recovery of the alcohol, the fermented liquor is treated with strontium oxide. A yellowish precipitate is formed containing unfermented maltose and polyoses in combination with strontium oxide. From the precipitate, suspended in water, the sugar may be recovered by passing in carbon dioxide down to pH 5.0, and the sugar then hydrolyzed as in Example 1. The solution remaining after removing the strontium oxide-unfermented sugar compound from the fermented mash is concentrated, acidified, for example, with sulfuric acid to a pH value of about 4, and steam-distilled under reduced pressure. Thereby the glycerol is more readily recovered than without the previous removal of the unfermented sugar.

Example 3.—A slaked lime slurry is added to the fermented mash of a glycerol fermentation. The solution contains 2% alcohol and about 4% unfermented carbohydrate sugars as well as 3% glycerine. 40 grams of the slaked lime per liter are added slowly with stirring at a temperature of 25° C. When the stirring is discontinued after a few minutes, a granular cream-colored precipitate begins to settle out. Carbon dioxide gas is added to the solution with stirring, and the pH is thereby reduced from about 11.5 to 8.0. The solution is then filtered and about 60% of the unfermented carbohydrate is removed from the solution. The precipitate is acid hydrolyzed with sulfuric acid at pH 0 to 1 and added to a subsequent fermentation mash preferably after neutralization and after separation from the insoluble calcium sulfate thus formed.

The fermented mash from which the precipitate is removed is concentrated and subjected to a steam distillation for the recovery of glycerol.

The mash to be fermented may be obtained by hydrolysis of a cereal like wheat, oats, corn, etc. or from other starchy materials, like potatoes.

We claim:

1. The method of separating maltose from solutions of saccharified starchy materials containing the same, comprising adding to such a solution a member of the group consisting of alkaline earth metal oxides and hydroxides at temperatures of about 0°–40° C. and in quantity sufficient to precipitate at least a substantial part of the maltose, mixing the materials and allowing them to stand until the compound of the metal base with the maltose begins to settle, removing the insoluble compound from the solution, and decomposing the compound by means of a member of the group consisting of acids and acid anhydrides which form sparingly soluble salts with the alkaline earth metal.

2. The method according to claim 1, in which the pH after precipitating the compound of maltose with the alkaline earth base is adjusted to between about 7.5 and 8.0 before separating the insoluble compound from the solution.

3. The method according to claim 1, wherein after the precipitation of the compound of the alkaline earth metal base and the maltose the pH value is adjusted to between about 7.5 and 8.0 with carbon dioxide gas before separating the insoluble compound from the solution.

4. The method according to claim 1, in which the precipitation of the maltose is carried out in the presence of alcohol.

5. The method of separating maltose from solutions of saccharified starchy materials containing the same, comprising adding to such a solution a member of the group consisting of alkaline earth metal oxides and hydroxides in quantity sufficient to precipitate at least a substantial part of the maltose, intimately mixing the materials to promote reaction, separating the sugar precipitate from the solution, and subsequently decomposing the precipitate to liberate the soluble sugars.

6. Method according to claim 5, wherein the decomposition is effected with the aid of a member of the group consisting of acids and acid-anhydrides which form sparingly soluble salts with the alkaline earth metal.

7. Method according to claim 5, wherein the alkaline earth metal compound is calcium oxide.

8. Method according to claim 5, wherein the alkaline earth metal compound is strontium oxide.

9. Method according to claim 5, wherein the alkaline earth metal compound is calcium hydroxide.

10. Method according to claim 5, wherein the decomposition of the precipitate is effected with dilute sulfuric acid.

11. The method of separating maltose from solutions of saccharified starchy materials containing the same, comprising fermenting a solution of saccharified starchy material for the production of glycerol, adding to the fermented solution a member of the group consisting of alkaline earth metal oxides and hydroxides at a temperature no higher than about 40° C. and in quantity sufficient to precipitate at least a substantial part of the maltose, mixing the materials and allowing them to stand until the compound of the metal base with the maltose begins to settle, removing the insoluble compound from the solution, and decomposing the compound by means of a member of the group consisting of acids and acid anhydrides which form sparingly soluble salts with the alkaline earth metal.

12. Process according to claim 11, wherein the adding of the alkaline earth metal base is made in the presence of the alcohol formed during the fermentation.

13. The method for the manufacture of glycerol which comprises adding to a maltose-containing solution of saccharified starchy materials a member of the group consisting of alkaline earth metal oxides and hydroxides at temperatures no higher than about 40° C. and in quantity sufficient to precipitate at least a substantial part of the maltose, separating the precipitate of the metal base with the maltose, subjecting the residual sugar solution to fermentation under alkaline conditions, and subsequently distilling glycerol from the fermented solution.

14. The method for the manufacture of glycerol which comprises fermenting a solution of saccharified starchy material under alkaline conditions and, prior to distillation of the formed glycerol, treating the solution with a metal base of the group consisting of alkaline earth metal oxides and hydroxides at a temperature no higher than about 40° C. and in quantity sufficient to precipitate at least a substantial part of the maltose, and separating the precipitate of the metal base with the maltose.

15. The method according to claim 14, wherein the treatment with the alkaline earth metal base takes place after the fermentation and in the presence of the formed alcohol.

16. The method according to claim 14, wherein the treatment with the alkaline earth metal base takes place at approximately room temperature.

EDUARD FÄRBER.
JAMES S. WALLERSTEIN.